United States Patent
Oberg

(10) Patent No.: US 8,867,327 B1
(45) Date of Patent: *Oct. 21, 2014

(54) METHOD AND APPARATUS FOR READING A STORAGE MEDIUM

(71) Applicant: Marvell International Ltd., Hamilton (BM)

(72) Inventor: Mats Oberg, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/971,954

(22) Filed: Aug. 21, 2013

Related U.S. Application Data

(63) Continuation of application No. 13/648,444, filed on Oct. 10, 2012, now Pat. No. 8,542,561.

(60) Provisional application No. 61/546,463, filed on Oct. 12, 2011.

(51) Int. Cl.
  *G11B 20/00* (2006.01)
  *G11B 27/10* (2006.01)
  *G11B 20/18* (2006.01)

(52) U.S. Cl.
  USPC ............ 369/53.1; 369/53.12; 369/47.33

(58) Field of Classification Search
  USPC ............ 369/47.33, 47.1, 47.12, 47.32, 53.2, 369/53.31, 53.41, 53.43, 53.44, 53.1, 53.12, 369/47.44
  See application file for complete search history.

(56) References Cited

U.S. PATENT DOCUMENTS

| 6,115,337 A | 9/2000 | Takagi et al. |
| 7,492,677 B2 | 2/2009 | Janssen et al. |
| 7,522,493 B2 | 4/2009 | Chou et al. |
| 8,184,516 B2 | 5/2012 | Kimmelmann et al. |
| 2010/0329094 A1 | 12/2010 | Ito |
| 2011/0080820 A1 | 4/2011 | Shim et al. |
| 2011/0305129 A1 | 12/2011 | Goto et al. |

*Primary Examiner* — Nabil Hindi

(57) ABSTRACT

Aspects of the disclosure provide a method. The method includes receiving regional quality information of a region on a storage medium, and adjusting a fill level threshold of a buffer based on the regional quality information. The fill level threshold is used to trigger filling the buffer with data read from the region.

12 Claims, 4 Drawing Sheets

METHOD AND APPARATUS FOR READING A STORAGE MEDIUM

INCORPORATION BY REFERENCE

This application is a continuation of U.S. application Ser. No. 13/648,444, filed on Oct. 10, 2012, now issued as U.S. Pat. No. 8,542,561, which claims the benefit of U.S. Provisional Application No. 61/546,463, filed on Oct. 12, 2011. The disclosures of the applications referenced above are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An optical disc may have imperfections, such as scratches and/or fingerprints on the disc surface. Such imperfections can be problematic when a disc drive reads data stored on the optical disc.

SUMMARY

Aspects of the present disclosure provide a method. The method includes receiving regional quality information of a region on a storage medium, and adjusting a fill level threshold of a buffer based on the regional quality information. The fill level threshold is used to trigger filling the buffer with data read from the region.

To receive the regional quality information, in an embodiment, the method includes scanning the storage medium to learn the regional quality information. In an example, the method includes scanning the storage medium to learn the regional quality information when a fill level of the buffer is above the fill level threshold.

In another embodiment, the method includes storing quality indicators in association with regions of the storage medium. In an example, the method includes storing a quality indicator based on a previous access to a region of the storage medium. For example, the method includes storing the quality indicator when the previous access to the region is not successful. In another example, the method includes storing the quality indicator when an error rate of the previous access to the region is higher than an error rate threshold.

To adjust the fill level threshold based on the regional quality information, in an embodiment, the method includes using a higher fill level threshold when the regional quality information is indicative of a defined error rate in the target reading region, and using a lower fill level threshold when the regional quality information is not indicative of the defined error rate in the target reading region.

Aspects of the present disclosure provide another method. The method includes reading data from a region on a storage medium prior to the region being a target reading region when a fill level of a buffer is above a fill level threshold, storing the data in a temporary memory space, and moving the data from the temporary memory space into the buffer when the region becomes the target reading region.

Aspects of the disclosure provide a circuit. The circuit includes a memory and a control circuit. The memory has a portion being allocated as a buffer to buffer data read from a storage medium, and to provide the data to a host device. The controller circuit is configured to receive regional quality information of a region on the storage medium, and adjust a fill level threshold based on the regional quality information. The fill level threshold is used to trigger filling the buffer with data read from the target reading region.

Aspects of the disclosure provide a medium drive. The medium drive includes a read unit and the circuit.

Aspects of the disclosure also provide a system. The system includes the host device and the medium drive.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
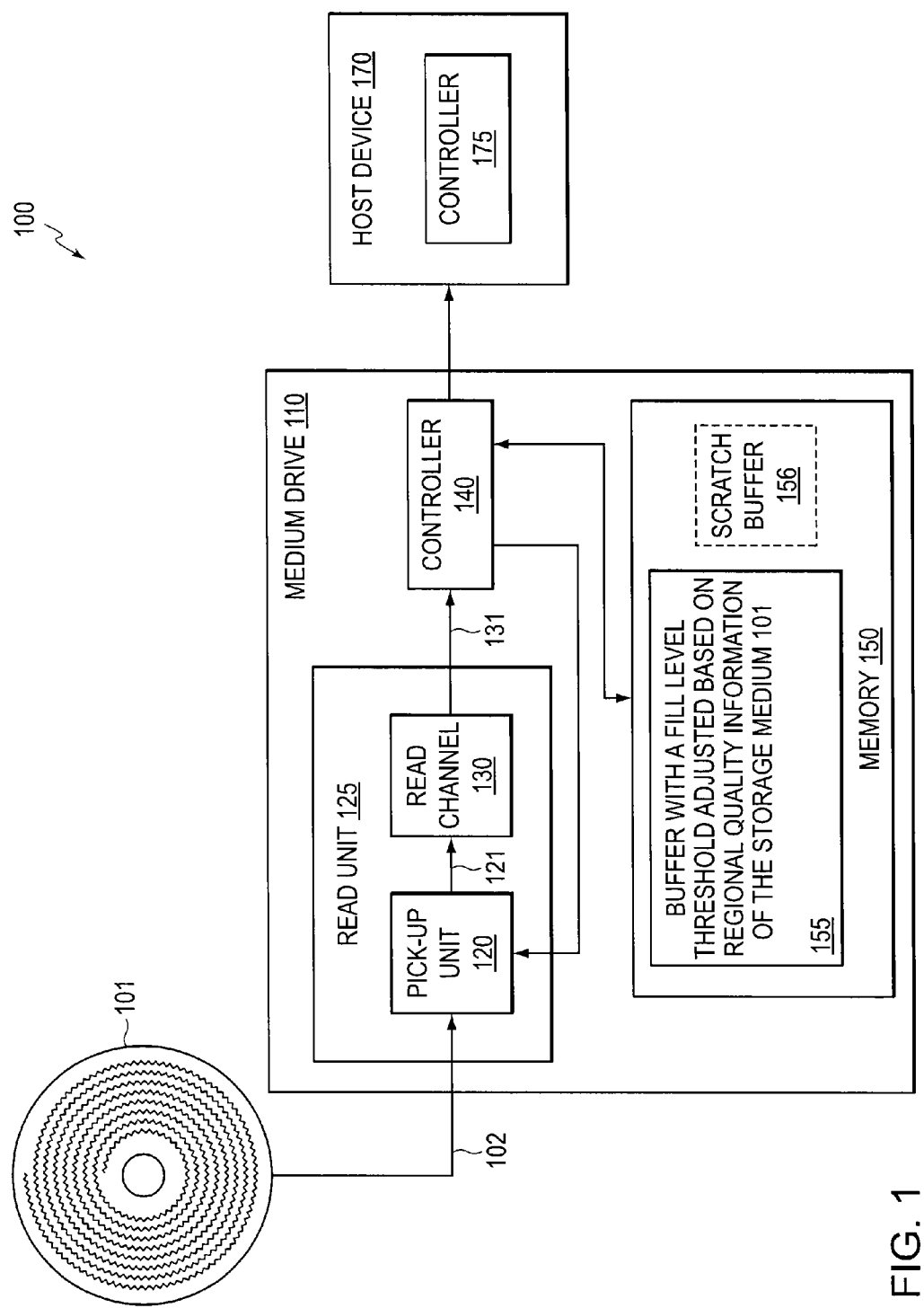
FIG. 1 shows a block diagram of a system 100 according to an embodiment of the disclosure.

FIG. 1 shows a block diagram of an electronic system 100 according to an embodiment of the disclosure. The electronic system 100 includes a medium drive 110 and a host device 170 coupled together as shown in FIG. 1. The host device 170 is configured to operate based on data stored in a storage medium 101. The medium drive 110 is configured to receive the storage medium 101, read data from the storage medium 101, and provide the data to the host device 170. According to an embodiment of the disclosure, the medium drive 110 is configured to operate based on regional quality of the storage medium 101 to improve system performance, user experience, and the like.

In the FIG. 1 example, the medium drive 110 includes a read unit 125, a controller 140 and a memory 150 coupled together as shown in FIG. 1. The read unit 125 includes a pick-up unit 120 and a read channel 130. The pick-up unit 120 receives a signal 102 and suitably generates an electrical signal 121 in response to the signal 102. The read channel 130 includes signal processing circuits to process the electrical signal 121, and extract data 131.

The controller 140 controls the operations of the read unit 125 and the memory 150. The memory 150 can be any suitable memory. In an example, the memory 150 is random access memory (RAM), such as static RAM (SRAM), dynamic RAM (DRAM) and the like. According to an embodiment of the disclosure, a portion of the memory 155 is configured as a buffer 155. The controller 140 controls the buffer 155 to buffer the data 131, and provide the buffered data to the host device 170.

It is noted that the storage medium 101 can be any suitable storage medium, such as an optical disc, a hard disc drive or a non-volatile memory, and the like. In an example, the storage medium 101 is a hard disk drive that stores data as magnetic field changes. The pick-up unit 120 includes a magnetic head that generates an electrical signal 121 in response to the magnetic field changes on the storage medium 101. The read channel 130 processes the electrical signal 121 and extracts the data 131.

In another example, the storage medium 101 is an optical disc, such as a compact disc (CD), a digital versatile disc (DVD), a Blu-ray disc, or the like, that stores data as optical property changes. The pick-up unit 120 is an optical pick-up unit that generates an electrical signal 121 in response to the optical property changes. Specifically, the pick-up unit 120 directs a light beam to the storage medium 101. The light beam is reflected from the storage medium 101. The signal 102, which is the reflected light beam, has light properties that correspond to the optical property changes on the storage medium 101. The pick-up unit 120 generates the electrical signal 121 in response to the light properties of the signal 102. The read channel 130 processes the electrical signal 121 and extracts the data 131.

The host device 170 can be any suitable device that operates based on the data stored on the storage medium 101. In an example, the host device 170 is an audio/video device that plays back audio and video based on audio and video application data stored on the storage medium 101. In another example, the host device 170 is a gaming device that interacts with a player based on game application data stored on the storage medium 101.

According to an aspect of the disclosure, the host device 170 requires data at a first rate that is different from a second rate that the read unit 125 reads data from the storage medium. Generally, the first rate is much slower than the second rate. In the FIG. 1 example, the electronic system 100 uses the buffer 155 to accommodate the rate difference. For example, the electronic system 100 is suitably configured such that the buffer 155 is drained constantly at about the first rate, and is filled intermittently at the second rate, and the average of the fill rate is about the first rate.

Specifically, in an example, the host device 170 includes a controller 175. The controller 175 and the controller 140 suitably communicate to maintain a data flow having the first rate from the buffer 155 to the host device 170.

Further, in an embodiment, the controller 140 controls the operations of the read unit 125 and the buffer 155 to fill the buffer 155 intermittently. In an example, the medium drive 110 is configured to have at least a first operation mode and a second operation mode. The first operation mode is also referred to as a read mode, and the second operation mode is also referred to as a pause mode. In the first operation mode, the controller 140 controls the read unit 125 to seek back to a target reading region on the storage medium 101, the read unit 125 reads data from the target reading region, and the controller 140 fills the data to the buffer 155. In the second operation mode, there is no need to fill the buffer 155.

According to an embodiment of the disclosure, the medium drive 110 enters the first operation mode and the second operation mode based on a fill level of the buffer 155 and a fill level threshold. In an example, the fill level of the buffer 155 is represented as a percentage of filled memory space to the total memory space of the buffer 155. During operation, in an example, when the fill level of the buffer 155 is lower than the fill level threshold, the medium drive 110 enters the first operation mode to read data from the storage medium 101 and fill the data into the buffer 155. When the buffer 155 is full (e.g., 100% of the fill level), the medium drive 110 enters the second operation mode to pause filling the buffer 155.

According to an aspect of the disclosure, the fill level threshold is suitably determined based on the regional quality of the storage medium 101 to provide improved user experience and to avoid buffer under-run.

According to an embodiment of the disclosure, the storage medium 101 includes regional imperfections that make reading data stored at those regions to be problematic. In the example, an optical disc has scratches, fingerprints, dusts, and the like, on regions of the optical disc. The scratches, fingerprints and dusts can cause optical disturbance when the pick-up unit 120 directs light to those regions, and can cause reading difficulties at those regions.

In an example, the regional imperfections increase an error rate. Generally, the medium drive 110 has error correction capability that can correct errors when the error rate is lower than an error rate threshold. When data read from the storage medium 101 has higher error rate, such as higher than the error rate threshold, the medium drive 110 can fail to correct the errors. The uncorrected errors may lower user experience. To improve user experience, in an embodiment, the medium drive 110 re-reads the region with same reading configuration or with different reading configurations, such as using different parameters in the pick-up unit 120, using different parameters in the read channel 130, and the like.

In another example, the regional imperfections can cause reading failure. For example, the medium drive 110 fails to identify sync marks from a region due to the regional imperfections. The medium drive 110 can re-read the region with same reading configuration or different reading configuration in order to read successfully.

According to an embodiment of the disclosure, because of the regional imperfections, the read unit 125 may read multiple times to successfully read the data or successfully lower the error rate to below the error rate threshold. Thus, it takes time to read data from the regions with regional imperfections, and thus the buffer 155 is required to have enough data to avoid under-run and to maintain the data flow to the host device 170 at about the first rate during the time of the re-read.

According to an aspect of the disclosure, the controller 140 adjusts the fill level threshold based on regional quality of the storage medium 101 to reduce system memory requirement, and improve user experience.

Further, according to an embodiment of the disclosure, the dynamically adjusted fill level threshold allows the buffer 155 to use a relatively small memory space to maintain the data flow to the host device 170, and reduces system memory requirement.

It is noted that the controller 140 can be implemented by various techniques. In an example, the controller 140 is implemented as logic circuits. In another example, the controller 140 is implemented as a processor executing software instructions.

It is also noted that the medium drive 110 can use any suitable techniques to obtain the regional quality information of the storage medium 110.

In an embodiment, the medium drive 110 scans the storage medium 110 to learn the regional quality information. For example, in an audio/video application, the medium drive 110 consecutively read regions on the storage medium, such as following a recording track. When the buffer 155 is full, the medium drive 110 enters the pause mode to pause filling the buffer 155 and perform scan operation on the subsequent regions to determine the regional quality information. It is noted that the scan operation does not store the data into the buffer 155.

In another example, in a gaming application, the medium drive 110 can read data from non-consecutive regions on the storage medium 101. The controller 140 keeps a record of indicators for problematic regions, such as a record of indicators for problematic radii. Specifically, when the buffer 155 is full, the medium drive 110 enters the pause mode to pause filling the buffer 155. The controller 140 controls the read unit 125 to perform scan operation on different radii of the storage medium 101, and learns the regional quality information of the different radii. For example, the controller 140 controls the read unit 125 to read back data from different radii. When a read to a radius of the disc fails, or when an error rate of the read-back data is larger than the error rate threshold, the controller 140 adds an indicator for the radius to indicate that it is difficult to read. Then, when a read target is at this radius, the controller 140 adjusts the fill level threshold to a higher level.

In an embodiment, initially, before the controller 140 has a chance to control the read unit 125 to scan the storage medium 101, the controller 140 assumes poor quality for each region, and stores indicators for all the regions. When the controller 140 controls the read unit 125 to scan the storage medium 101, the controller 140 removes the indicators to high quality regions.

It is noted that, in an example, the controller 140 uses any previous access information, such as previous read operation to the regions or scan operation to the regions, to obtain the regional quality information.

According to another aspect of the disclosure, the medium drive 110 can use the regional quality information to improve system performance.

It is noted that, in an example, the read channel 130, the controller 140 and the memory 150 are implemented as integrated circuits on one or more integrated circuit (IC) chips.

Figure 2:
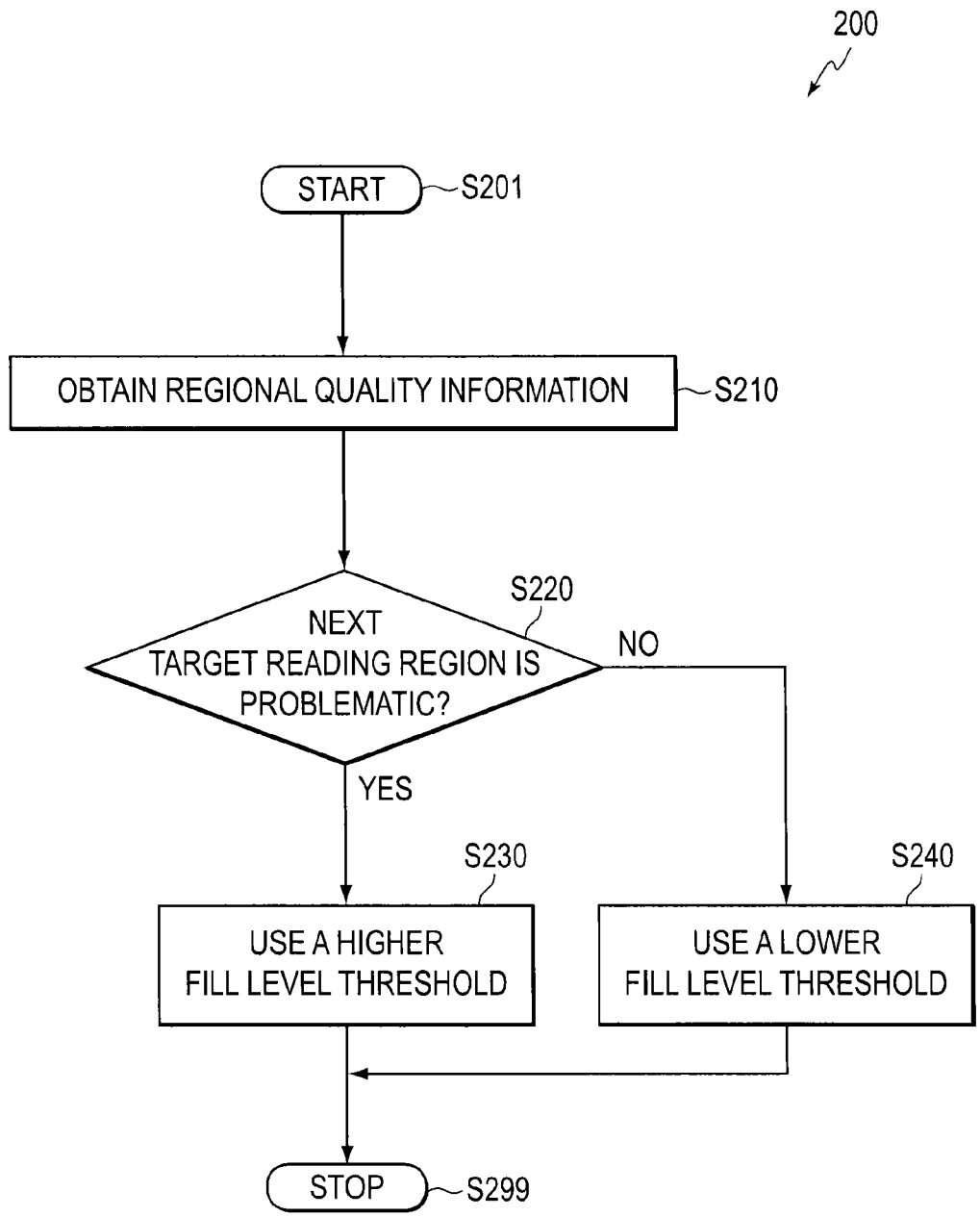
FIG. 2 shows a flow chart outlining a process 200 according to an embodiment of the disclosure.

FIG. 2 shows a flow chart outlining a process 200 for the controller 140 to adjust the fill level threshold of the buffer 155 according to an embodiment of the disclosure. The process starts at S201 and proceeds to S210.

At S210, the controller 140 obtains regional quality information of the storage medium 101. In an embodiment, the controller 140 controls the read unit 125 to scan the storage medium 101 to learn the regional quality information when the medium drive 110 enters the pause mode. For example, the controller 140 controls the read unit 125 to scan a subsequent portion on a track of an optical disc to learn the regional quality information of the subsequent portion. In another embodiment, the regional quality information is collected from previous read operations to the regions of the storage medium 101 and stored. In an example, the controller 140 keeps a record of indicators to problematic radii of an optical disc based on previous access to the radii.

It is noted that the controller 140 can obtain the regional quality information of the storage medium 101 from any other suitable sources.

At S220, the controller 140 determines whether the next target reading region is problematic. In an audio/video application, the subsequent portion is the target reading region, and the controller 140 determines whether the subsequent portion is problematic based on the scan of the subsequent portion. For example, when reading the subsequent portion in the scan operation fails or when an error rate of the read-back data during the scan operation is higher than the error rate threshold, the target reading region is problematic.

In a gaming application, the target reading region is determined based on the gaming application and interaction with the player. Then, the controller 140 determines whether there exists an indicator that is indicative of problem at the target reading region.

When the target reading region is problematic, the process proceeds to S230; otherwise the process proceeds to S240.

At S230, the controller 140 uses a relatively higher fill level threshold to control filling the buffer 155. Thus, the buffer 155 has a relatively large volume of data to maintain the data flow to the host device 170, to allow time for re-reading the problematic region, and to avoid buffer under-run. Then, the process proceeds to S299 and terminates.

At S240, the controller 140 uses a relatively lower fill level threshold to control filling the buffer 155. Thus, the medium drive 110 has less frequent seek-backs to the storage medium, and the less frequent seek-backs reduce noise level and improve user experience. Then, the process proceeds to S299 and terminates.

It is noted that process 200 can be repetitively executed by the controller 140.

Figure 3:
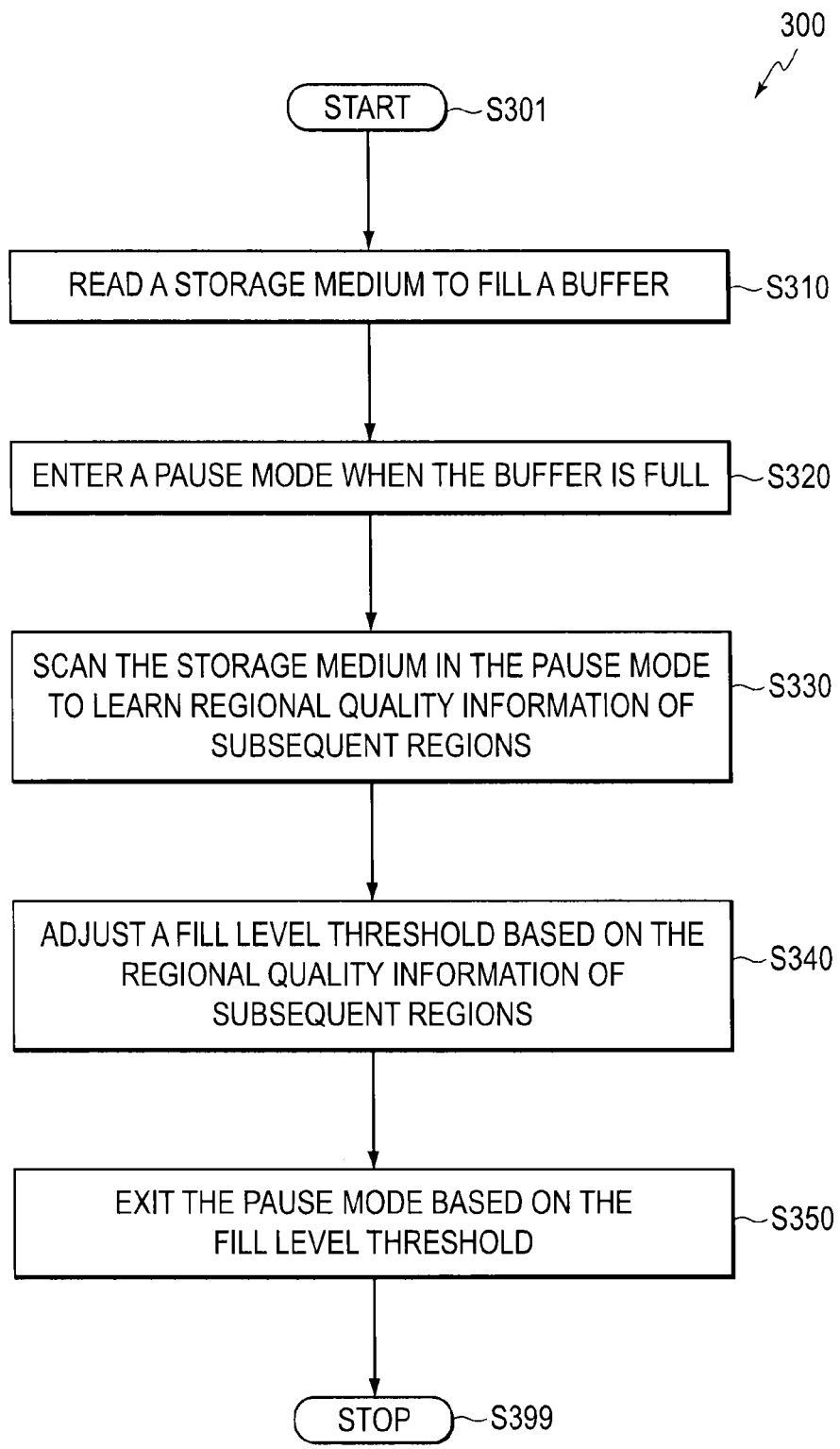
FIG. 3 shows a flow chart outlining a process 300 according to an embodiment of the disclosure.

FIG. 3 shows a flow chart outlining a process 300 for the medium drive 110 to operate on the storage medium 101 according to an embodiment of the disclosure. The medium drive 110 reads the storage medium 101 and provides data to the host device 170. The host device 170 requires data at the first rate that is slower than the second rate at which the medium drive 110 extracts data from the storage medium 101. The process starts at S301, and proceeds to S310.

At S310, the medium drive 110 is in the read mode, and the controller 140 controls the read unit 125 to perform read operation to the storage medium 101 to extract data at the second rate and fill the read-back data in the buffer 155 at the second rate.

At S320, the medium drive 110 enters the pause mode when the buffer 155 is full. In the pause mode, the controller 140 does not need to the buffer 155, and can perform other operations to improve system performance.

At S330, the controller 140 controls the read unit 125 to scan the storage medium 101 to learn regional quality information. In an example, the controller 140 controls the read unit 125 to read a subsequent portion of a track on an optical disc, but does not store the read-back data in the buffer 155. When the read fails or when an error rate of the read-back data is larger than a threshold, the controller 140 determines that the subsequent portion is problematic and has poor quality; otherwise, the controller 140 determines that the subsequent portion has good quality.

At S340, the controller 140 adjusts the fill level threshold based on the regional quality. In an example, the controller 140 uses a relatively high fill level threshold when the subsequent portion has poor quality; and uses a relatively low fill level threshold when the subsequent portion has good quality.

At S350, the medium drive 110 exits the pause mode, and enters the read mode based on the fill level threshold. For example, data in the buffer 155 is provided to the host device 170 at the first rate, and memory space in the buffer 155 is freed at the first rate. When the fill level of the buffer 155 drops below the fill level threshold, the medium drive 110 exists the pause mode and enters the read mode to read data from the storage medium 101, and fill the buffer 155 at the second rate. Then, the process proceeds to S399 and terminates.

It is noted that the process 300 can be repetitively executed. For example, at S350, the process returns to S310.

Figure 4:
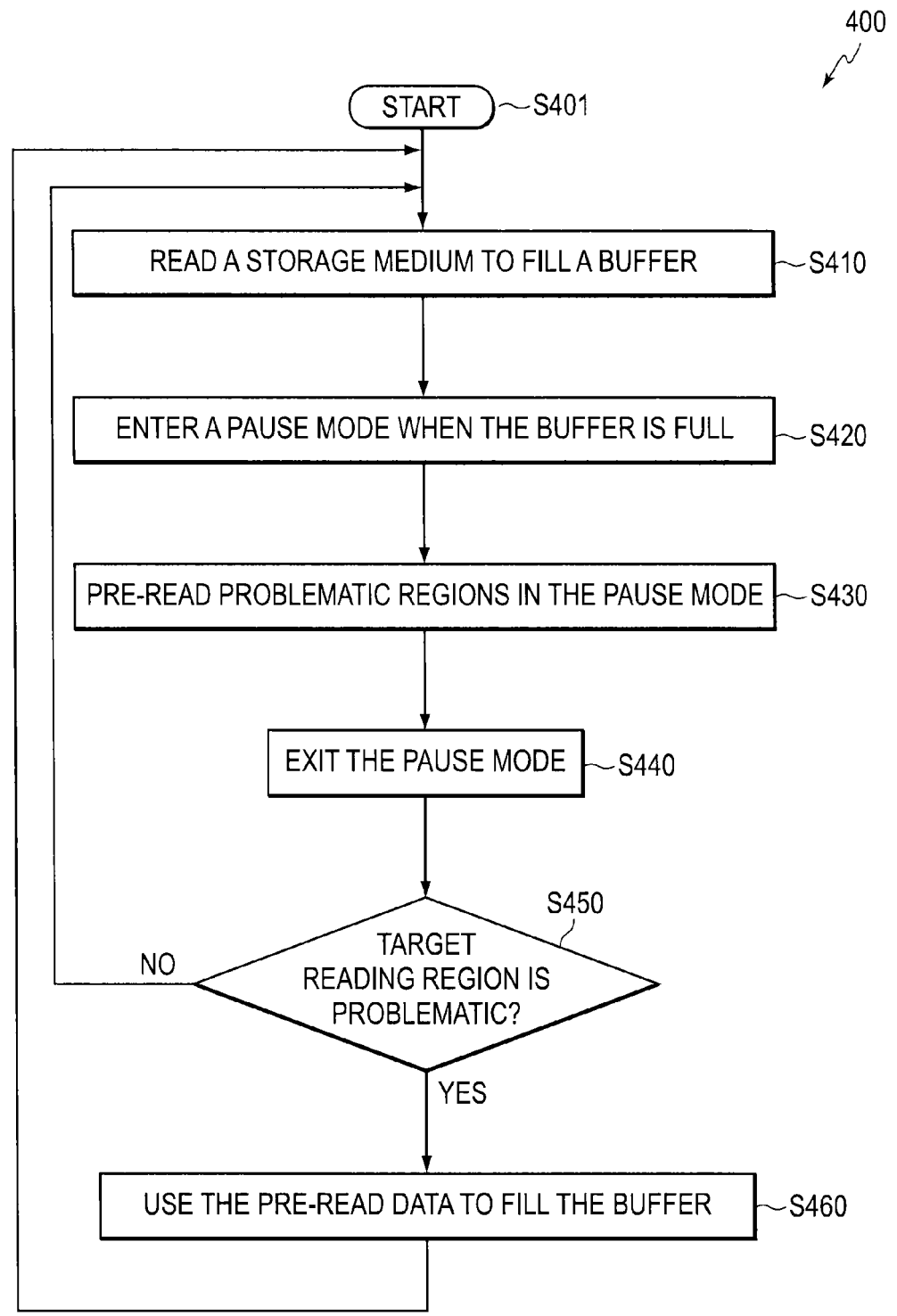
FIG. 4 shows a flow chart outlining a process 400 according to an embodiment of the disclosure.

FIG. 4 shows a flow chart outlining a process 400 for the medium drive 110 to operate on the storage medium 101 according to an embodiment of the disclosure. The medium drive 110 reads the storage medium 101 and provides data to the host device 170. The host device 170 requires data at the first rate that is slower than the second rate at which the medium drive 110 extracts data from the storage medium 101. The process starts at S401, and proceeds to S410.

At S410, the medium drive 110 is in the read mode, and the controller 140 controls the read unit 125 to perform read operation to the storage medium 101 and fill the read-back data in the buffer 155.

At S420, the medium drive 110 enters the pause mode when the buffer 155 is full.

At S430, when the medium drive 110 is in the pause mode, the controller 140 controls the read unit 125 to pre-read problematic regions. In an example, the controller 140 controls the read unit 125 to repetitively re-read a hard-to-read portion in a problematic region, such as a hard-to-read code-word, a hard-to-read sector, and the like. It is noted that, in an example, the read unit 125 adjusts read parameters to repetitively re-read the hard-to-read portion. When the read unit 125 successfully extracts the data, the controller 140 controls the memory 150 to store the hard-to-read data in a temporary memory space, such as the scratch buffer 156.

At S440, the fill level of the buffer 155 drops below the fill level threshold, the medium drive 110 exits the pause mode and enters the read mode.

At S450, the controller 140 determines whether the target reading region is a problematic region. When the target reading region has good quality, the process returns to S410; and when the target reading region has poor quality, the process proceeds to S460.

At S460, the controller 140 suitably moves the hard-to-read data from the temporary memory space into the buffer 155. Then, the process returns to S410.

It is noted that the medium drive 110 can separately execute the process 300 or the process 400, and can suitably execute a combined process of 300 and 400.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit, comprising:
   a controller circuit configured to cause a scan of a storage medium when a fill level of a buffer is above a fill level threshold to determine regional quality information of a region on the storage medium, the fill level threshold being used to trigger filling the buffer with data read from the region, and receive the regional quality information, and adjust the fill level threshold based on the regional quality information.

2. The circuit of claim 1, further comprising:
   a memory having a portion being allocated as the buffer to buffer data read from the storage medium, and to provide the data to a host device.

3. The circuit of claim 2, wherein the memory is configured to store quality indicators in association with regions of the storage medium.

4. The circuit of claim 2, wherein the memory is configured to store a quality indicator in association with the region based on a previous access to the region.

5. The circuit of claim 4, wherein the memory is configured to store the quality indicator when the previous access to the region is not successful.

6. The circuit of claim 4, wherein the memory is configured to store the quality indicator when an error rate of the previous access to the region is higher than an error rate threshold.

7. The circuit of claim 1, wherein the controller circuit is configured to use a higher fill level threshold when the regional quality information is indicative of a defined error rate in the region.

8. The circuit of claim 1, wherein the controller circuit is configured to use a lower fill level threshold when the regional quality information is not indicative of a defined error rate in the region.

9. A medium drive having the circuit of claim 1, comprising:
   a read unit configured to read data from the storage medium and provide the data to the circuit.

10. The circuit of claim 1, further comprising:
    a temporary memory space configured to store the data read from the region.

11. The circuit of claim 10, wherein the data is moved from the temporary memory space to the buffer when the region becomes a target reading region.

12. The circuit of claim 1, wherein the data is read from the region when the region is indicated as being problematic to access.

* * * * *